March 27, 1951 W. A. ANDERSON 2,546,813

SIGNAL SHAPING AMPLIFIER

Filed Jan. 31, 1946 4 Sheets-Sheet 1

INVENTOR
WARREN A. ANDERSON
BY H. S. Grover
ATTORNEY

Inventor
WARREN A. ANDERSON
By Harry Tunick
Attorney

Inventor
WARREN A. ANDERSON
By Harry Funick
Attorney

March 27, 1951 W. A. ANDERSON 2,546,813

SIGNAL SHAPING AMPLIFIER

Filed Jan. 31, 1946 4 Sheets-Sheet 4

Inventor

WARREN A. ANDERSON

By Harry Tunick

Attorney

Patented Mar. 27, 1951 2,546,813

UNITED STATES PATENT OFFICE 2,546,813

SIGNAL SHAPING AMPLIFIER

Warren A. Anderson, West Brighton, N. Y., assignor to Radio Corporation of America, a corporation of Delaware Application January 31, 1946, Serial No. 644,520

8 Claims. (Cl. 178—70)

This invention relates to signal shaping amplifiers and has for its principal object to provide an amplifier system which is simple in construction and which is effective in translating mutilated telegraph signals into readable on-off signals of rectangular shape, constant amplitude and constant weight. By "weight" I refer to the ratio between the marking time and the spacing time of a signal having dot unit length.

In long distance radio telegraphy the signals picked up by the radio receiver are very often severely distorted. Atmospheric conditions cause the signals to be received by diverse paths and quite often to be elongated. Other causes contribute to the mutilation. In order to overcome these effects various wave shaping systems have been devised in the past. The majority of these systems employ cut-off tubes to obtain a threshold value for the amplitude of the signal. Limiting amplifiers have also been provided for maintaining constant the amplitude of the output signals. Unfortunately, the use of a fixed threshold voltage on the grids of an amplifier causes the weight or mark-to-space ratio of the output signal to vary as the input signal amplitude varies.

In view of the difficulties encountered in the past, it is an object of my invention to provide in a receiving system a signal shaping amplifier a characteristic of which is to vary the threshold bias as a function of the signal amplitude.

Another object of my invention is to provide a signal shaping amplifier in which the mark-to-space ratio of the output signal is maintained constant despite input level variations.

Figure 1:
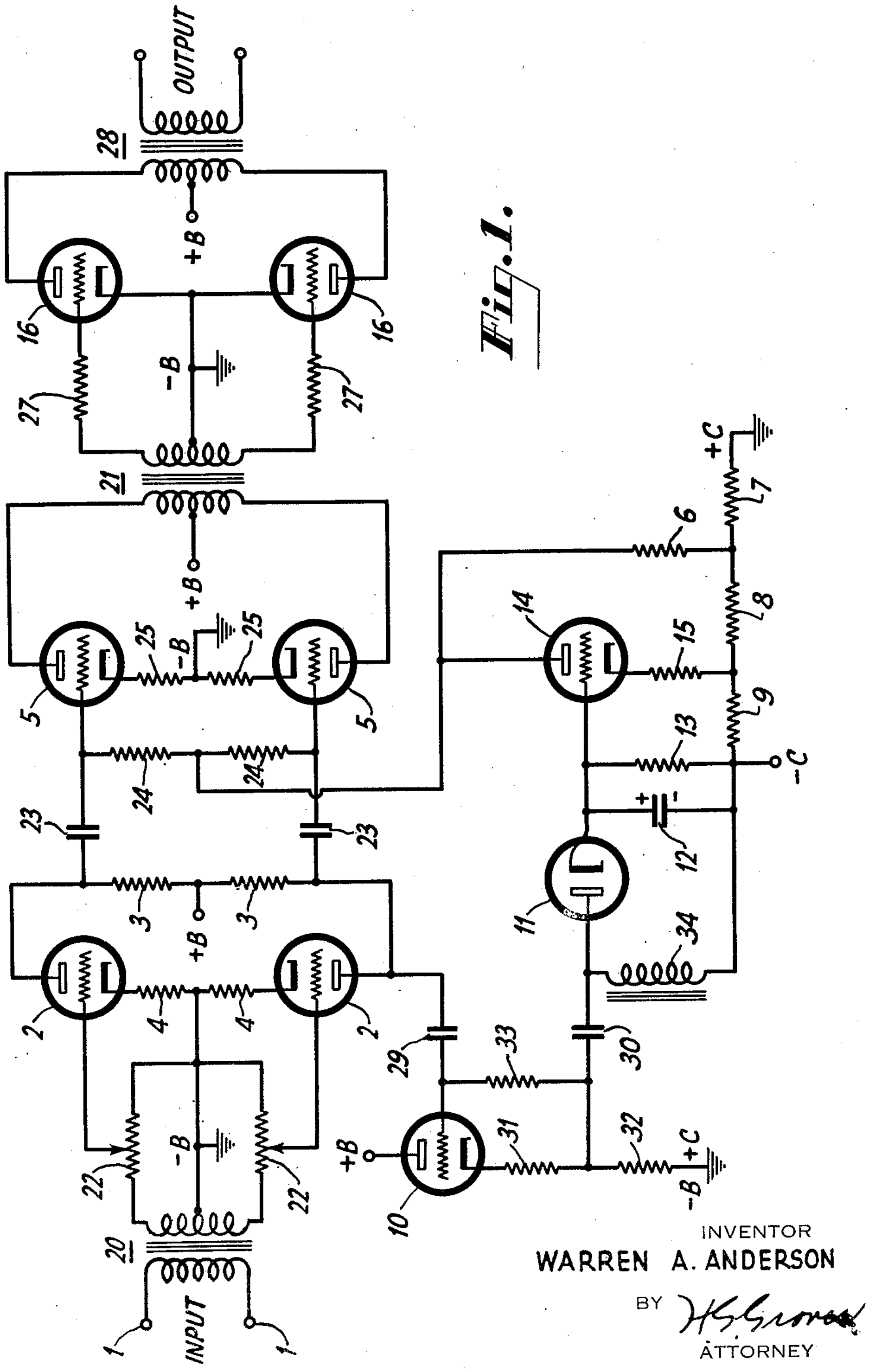
Figure 2:
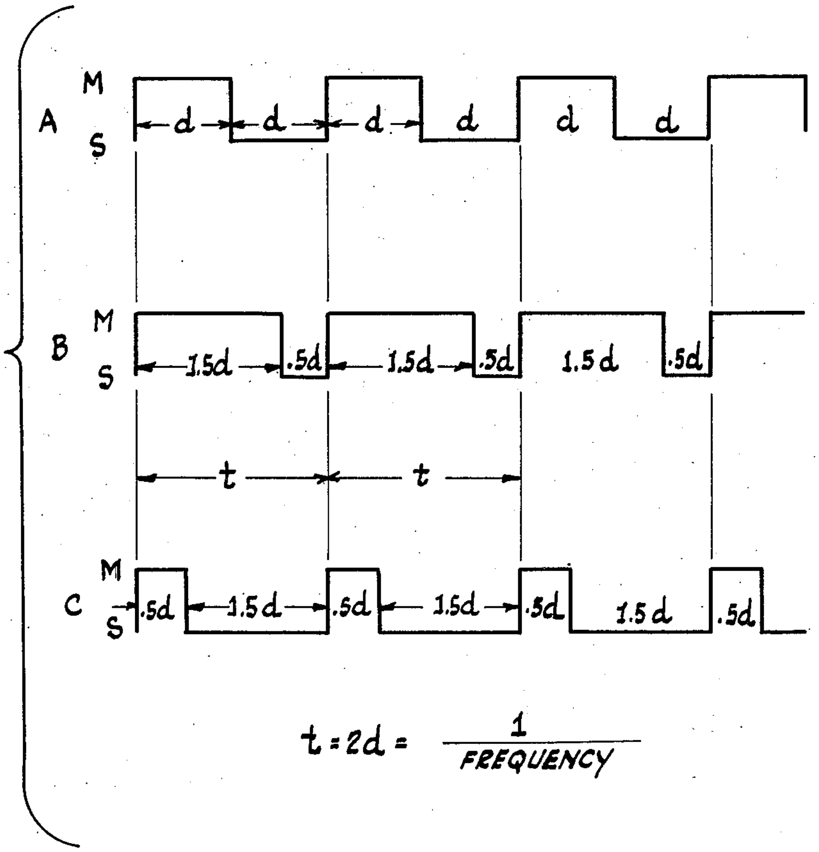
Figure 3:
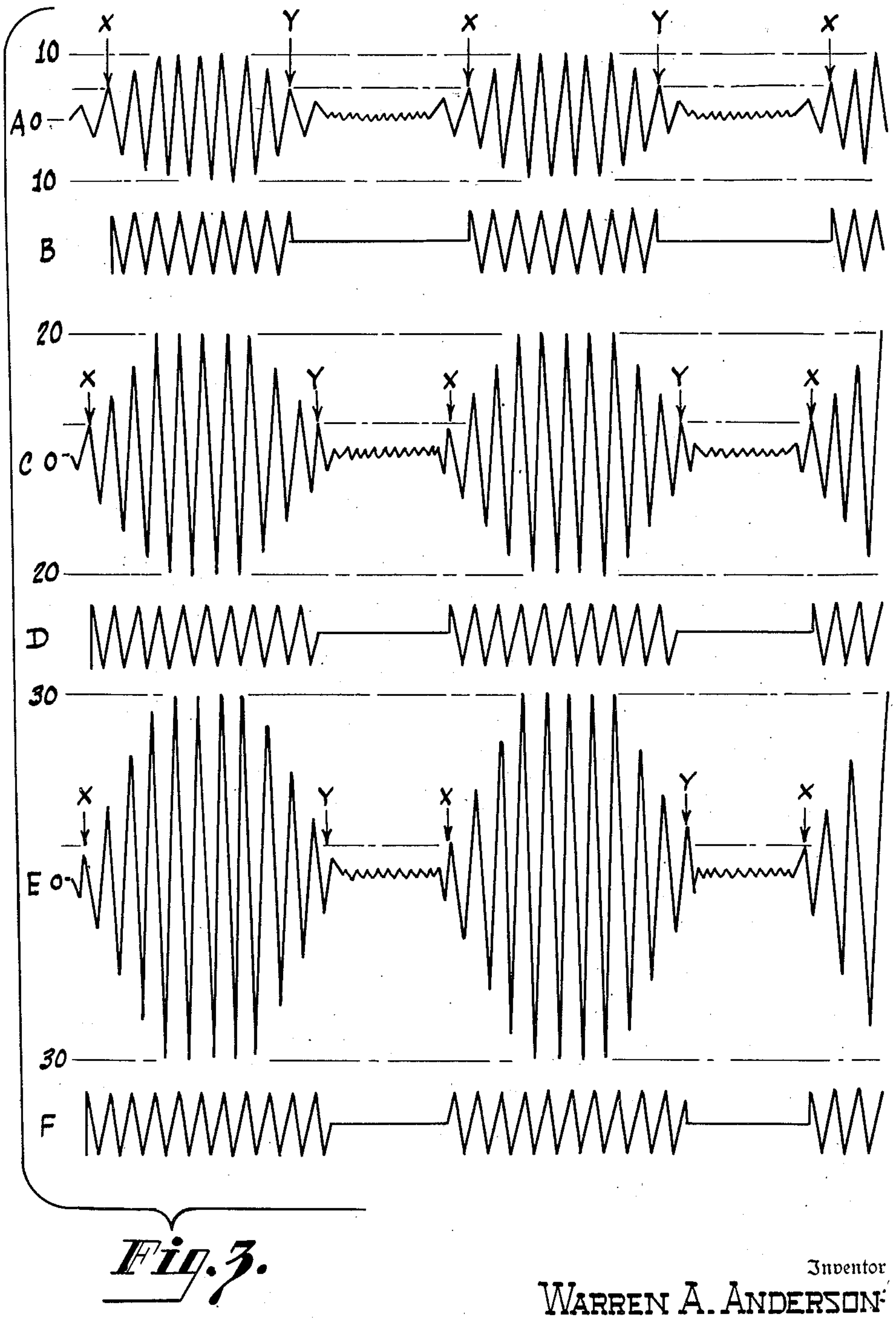
Figure 4:
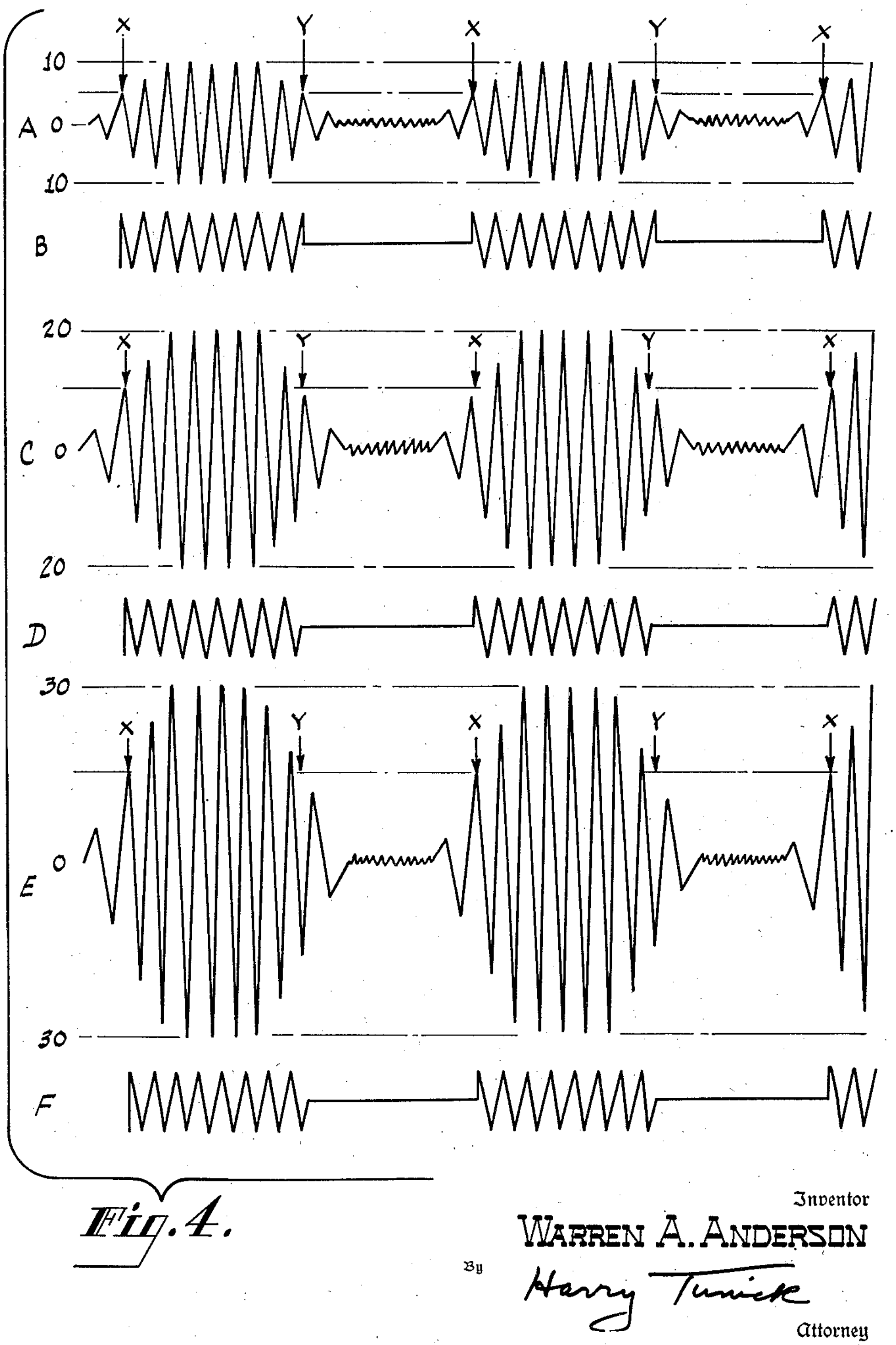

Other objects and advantages of my invention will be made apparent in the detailed description to follow. This description is accompanied by a drawing, wherein Fig. 1 represents a preferred circuit arrangement for carrying out the invention; Figs. 2, 3 and 4 each illustrate a series of curves given in explanation of the operation of the invention.

Briefly stated, the invention employs a threshold amplifier stage the bias of which is developed by a long time constant peak measuring voltmeter, and a limiter amplifier. The peak measuring voltmeter develops a bias for the threshold amplifier which allows it to pass only a predetermined percentage of the input signal. The limiter amplifier places a maximum limit on the output of the threshold amplifier. Thus constant weight and amplitude signals are delivered to the outgoing line.

Referring to the drawing, I show input terminals 1 across which the primary of a transformer 20 is connected. The transformer secondary is connected to a load consisting of two potentiometers 22, the interconnected ends of which are grounded. A center tap on the secondary winding of transformer 20 is also grounded.

Two amplifier tubes 2 are connected in push-pull fashion and are provided with input circuits which include taps on the potentiometers 22. The output circuits of these tubes include anode circuit resistors 3 through which anode potential is supplied from a direct current source indicated by the +B terminal. The —B terminal of this source is grounded.

Cathode resistors 4 are connected between the respective cathodes of the tubes 2 and ground. These cathode resistors are common to the input and output circuits.

Discharge tubes 5 are also connected in push-pull fashion and possess input and output circuits which are characterized as follows: The cathodes are connected to ground through cathode resistors 25. The anodes are supplied with direct current from the +B source which is connected to a mid-tap on the primary winding of a transformer 21. The terminals of this primary are connected respectively to one and the other of the anodes in the tubes 5. The control grids in these tubes are individually coupled to the respective anodes in tubes 2 by capacitors 23.

The grids in tubes 5 are normally maintained at a bias which is negative with respect to their associated cathodes. The negative value of this bias is equal to the voltage drop across two resistors 6 and 7 which connect the junction between the two resistors 24 to ground. Resistor 7 in series with resistors 8 and 9 constitute a voltage divider or bleeder resistor and are connected across the terminals of a biasing source indicated as +C and —C respectively, the +C terminal being grounded.

Resistor 6 serves as a load to amplifier tube 14 whose cathode is connected through a cathode resistor 15 to the junction between resistors 8 and 9. The input circuit of tube 14 includes a resistor 13 in shunt with a capacitor 12, components 12 and 13 being connected between the control grid and the —C source terminal. The grid of tube 14 is also directly connected to the cathode of a diode rectifier tube 11. The function of this tube will presently be explained.

An amplifier discharge tube 10 has its cathode connected to ground through resistors 31 and 32. Its input circuit includes resistor 33 which is connected between the junction of resistors 31 and 32 and the control grid. Tube 10 receives its control (that is, receives its excitation) from the anode in one of the tubes 2, this anode being coupled to the grid in tube 10 by a capacitor 29. The anode in tube 10 is supplied with +B potential. The junction between resistors 31 and 32 is coupled to the anode in tube 11 by a circuit consisting of an inductive choke 34 and a capacitor 30.

The output circuit from the push-pull tubes 5 is coupled across transformer 21 to the input circuit of tubes 16 which are connected in push-pull fashion. The cathodes of tubes 16 are both grounded, as is the center tap on the secondary winding of transformer 21. The terminals of this secondary are connected individually to the grids in tubes 16, connections being made through resistors 27. The output circuit from tubes 16 includes the primary winding of a transformer 28. This primary winding is connected at its mid-tap to the +B source. The secondary winding of transformer 28 is connected to output terminals and delivers a keyed tone signal, one characteristic of which is that it possesses constant amplitude for marking pulses.

The operation of my improved signal shaping amplifier will now be explained. The principal feature of the invention is the means for varying the bias on the grids of the push-pull tubes 5. This means includes the circuit arrangement of tubes 10, 11 and 14 and their associated circuit components.

As before stated, tube 10 derives its control (that is, receives its excitation) from the anode in one of the tubes 2. The variations of voltage drop in the cathode resistors 31 and 32 are reflected in a variable amplitude of current rectified by the diode tube 11. The effects of this rectification are, however, smoothed out by means of the time constant circuit consisting of resistor 13 in shunt with the capacitor 12.

Tube 14 derives its control from the cathode voltage in tube 11. Tube 14 acts as a shunt of variable resistance with respect to the resistor 6 in the biasing circuit for the grids in the tubes 5.

The output from amplifier tube 10 is adjusted to some predetermined percentage of its input. In practice, this adjustment has been found to be an optimum when it is less than 100 per cent. The variable charge on condenser 12 is arranged to satisfactorily control the conductive state in tube 14 by virtue of a relatively high resistance value which is chosen for resistor 13. The electrode of capacitor 12 which is connected to the cathode of tube 11 tends to be driven positive and thus renders tube 14 more or less conductive.

Other components of my improved circuit are so chosen that when the input signal is of zero value there is no voltage drop across resistor 13 and this condition renders tube 14 non-conductive due to the voltage drop across resistor 9. In this instance a net bias applied to the grids of the threshold tubes 5 equals the drop across resistor 7 in the voltage divider which just cuts off tubes 5. With this arrangement the bias on tubes 5 in the presence of signal is always the cut-off voltage plus a fixed percentage of the applied signal.

In the presence of an incoming marking signal, the cut-off bias applied to tubes 5 is varied as a function of the input signal amplitude. The control voltage applied through capacitors 23 is, however, sufficient to render tubes 5 conductive in order to translate the input marking signal into useful energy for delivering signals in the output circuit at constant amplitude. Thus, the signal amplitude itself varies the thresholding bias on the input circuits of tubes 5. The effect of operation of the circuit is to maintain in the output signal from tubes 5 a constant ratio between mark and space signal components of unit length despite variations in input level.

The output of the threshold stage 5, 5 is transformer coupled to the push-pull limiting amplifiers 16 which complete the signal shaping process and deliver constant amplitude tone signals to the outgoing line or utilization device.

The operation of applicant's invention will now be explained with reference to the curves of Figs. 2, 3 and 4. Figure 2 shows three different signals A, B and C with various weights. The letter M represents the length of the marking element on the same horizontal line therewith, while the letter S represents the spacing element on the same horizontal line with this last letter. Signal A is a transmitted signal consisting solely of reversals, each baud which is of unit length "$d$." This unit length, $d$, is a function of keying speed and method of transmission. For single channel, start-stop operation at 62 words-per-minute, $d$ is about 22 milliseconds; while at 100 words-per-minute, $d$ is about 13.5 milliseconds. The rate of reversals is the keying frequency "$f$" and $t$ is equal to $$\frac{1}{\text{frequency}}$$

or the time for one cycle. Since $d$ is the time for one-half cycle, then $t=2d$.

Signal B represents a received signal where the marking element has been elongated due to multipath, etc. Since the marking element in signal B is $1.5d$ or $.75t$ and the spacing is $.5d$ or $.25t$, this signal is referred to as having a weight of 75/25.

Signal C represents a received signal where the marking has been shortened due to multipath, etc. Since the marking is $.25t$ and the spacing is $.75t$, this signal is referred to as having a weight of 25/75.

Referring to Figure 1 of the drawing it is evident that if the connection from the anode of tube 2 to the condenser 29 is broken and if the junction of the two resistors numbered 24 is grounded, there will result a straightforward amplifier. Doing the above eliminates the effect of tubes 10, 11, 14 and associated components.

In prior systems, in order to achieve thresholding the junction of the resistors 24 would be connected to a battery of minus polarity instead of ground. The use of a fixed threshold voltage on the grids of 5 caused the weight of the output signal to vary with input signal amplitude. This is shown in Figure 3. The letter X shows the point at which tubes 5 start to conduct and the letter Y shows the point at which tubes 5 just stop conducting.

In Fig. 3, the signal of line A shows a received signal. The tone measures 20 volts peak-to-peak or 10 volts each side of zero. This is for marking. The spacing is essentially zero with some noise. Using a fixed threshold voltage of −5 volts results in the output of transformer 28 being 50/50 as shown in the signal of line B.

Line C of Fig. 3 shows a signal with the same weight as line A, but the amplitude has increased to 40 volts peak-to-peak. With the fixed threshold voltage of −5 volts, the output signal now has a weight of 60/40, as shown in line D of Fig. 3.

Line E of Fig. 3 shows a received signal whose weight is the same as the signal of line A of Fig. 3, but whose amplitude is 60 volts peak-to-peak. With the fixed threshold voltage of −5 volts, the output signal now has a weight of 67/33, as shown in line F of Fig. 3.

If we now proceed to eliminate the battery and re-connect condenser 29 to the anode of tube 2 and the junction of the resistors 24 to the anode of tube 14 and resistor 6, we have the circuit of the present invention. This circuit can be considered as a battery with a varying voltage. The battery voltage will be a certain predetermined portion of the input signal. This threshold voltage will vary with input signal voltage, as explained below.

The input signal is coupled from the anode of tube 2 through condenser 29 to the grid of tube 10. The output of tube 10 is coupled through condenser 30 to the rectifier stage. The output of tube 10 is always some fraction of its input. It can never be 100% or more. The desired fraction can be achieved by proper selection of resistors 31 and 32. The rectifier stage 11 causes condenser 12 to be positively charged and since resistor 13 has relatively high resistance, condenser 12 will keep its positive charge for a long time, in comparison to the time of one keying cycle. The voltage across condenser 12 determines the current flow through tube 14 and resistor 6. The drop across resistor 6 determines the bias on tubes 5. Since tube 14 has a gain of −1, the bias on tubes 5 is a function of the voltage across condenser 12. The voltage across condenser 12 is a function of the peak voltage of the tone signals coupled from 10 through condenser 30 to the rectifier stage. Since the amplitude of the tone signals coupled through condenser 30 is a predetermined portion of the amplitude of the input signals, it is evident that the threshold bias on the grids of tubes 5 is a function of input signal amplitude. When there is no input signal, resistors 7, 8, 9 and 15 are of such value to provide enough voltage across resistor 6 to just keep tubes 5 biased off.

Figure 4 shows how this varying threshold voltage helps to maintain an output of constant weight when the input signal weight remains constant but its amplitude varies.

The signals of lines A, C and E of Figure 4 are identical to the signals of lines A, C and E of Figure 3. The same input signal with similar amplitude variations are used in both cases.

Line A of Figure 4 shows a received signal of 20 volts peak-to-peak of 10 volts each side of zero. If it is assumed that the associated components of tube 10 are such as to give 50% of the input signal as threshold voltage, then the threshold voltage at the grids of tubes 5 is −5 volts. This coincides with the fixed threshold voltage in Figure 2 and the weight of the output signal is 50/50 in both cases, as shown in line B.

Returning to Figure 4, line C, the input signal amplitude has increased to 20 volts, the threshold voltage is now −10, the weight of the output signal is still 50/50 as shown in line D.

Line E of Figure 4 shows an input signal whose amplitude is now 30 volts, the threshold voltage is now −15 volts. The weight of the output signal is still 50/50 as shown in line F of Fig. 4.

From Figure 3 it can be seen that the distance between X and Y along the time axis (horizontal) increases with input signal amplitude while from Figure 4 it is seen that the distance between X and Y remains constant for all values of input signal amplitude.

It will be understood by those skilled in the art that the output terminals of my improved signal shaping amplifier may be connected to any desired utilization device. Ordinarily, the output would be rectified and applied to a locking circuit either directly or through a telegraph distributor.

Various modifications of my improved circuit arrangement, the preferred form of which is herein shown, may, of course, be made without departing from the spirit and scope of the invention.

I claim:

1. In a telegraph receiving system, a telegraph signal shaping circuit arrangement of the type which substantially restores the original rectangular pattern of on-off keyed tone signals, and maintains constant the weight of the marking elements thereof, said arrangement comprising a plurality of at least three cascaded amplifier stages, means for supplying the input of said first stage with telegraph signals transmitted from a remote point and which may be distorted by the medium over which they pass, means for variably controlling the value of the direct current bias potential applied to the input electrodes of the second said amplifier stage as a function of the output potentials derived from the first stage, and means for producing a limiting action in the third stage.

2. A signal shaping amplifier comprising a translating circuit arrangement having a first push-pull amplifier stage on the input circuit of which keyed telegraph signals are impressed, a second push-pull amplifier stage coupled to said first stage and subject to control by output energy from said first stage, a limiting amplifier stage disposed in cascade relation to said second amplifier stage, and means coupled to the output of said first stage for varying the cut-off bias potential applied to the input electrodes of said second amplifier stage as a function of the amplitude of the signal output from the first stage, said means including electronic devices for amplification, rectification and for producing a variable impedance in series with a source of biasing potential for said second stage.

3. A shaping circuit for keyed tone signals comprising at least three cascaded push-pull amplifier stages of which the first controls the second, and the second controls the third, a direct current source having a voltage divider connected across its terminals, a circuit of variable impedance interconnecting two points on said voltage divider and including the space discharge path of an electron tube, a direct current biasing circuit for the second said amplifier stage, said last circuit including said circuit of variable impedance, means coupled to said first stage for amplifying and rectifying a component of signal energy as derived from the first said push-pull stage, connections for feeding the product of said last means to the input circuit of said tube, thereby to control the same, whereby the level of the cut-off bias in said second stage is varied as a function of the incoming signal amplitude, and means in circuit with said third stage for producing a limiting action in the third said push-pull amplifier stage.

4. In a device for translating distorted telegraph signals into tone-modulated mark elements having a substantially rectangular envelope and having a corrected weight relation to the intervening space elements, a push-pull amplifier system having at least three concatenated stages, a variable impedance network disposed in a grid-cathode biasing circuit for the second of said stages, said network including a direct current source and a controllable discharge tube which possesses its own input and output circuits arranged for activation by said source, and means including an amplifier coupled to the output of said first stage and subject to control from the first stage in said system and including a rectifier having a time constant circuit coupled between said amplifier and the input of said controllable tube in said variable impedance network, the last said means being effective to regulate the bias potential which is applied to the input circuit of said second stage, said time constant circuit including a capacitor and a resistor in the input circuit of said controllable discharge tube, said time constant circuit being effective to produce relatively slow changes of biasing potential applied to the input circuit of said second stage, and means for operating said third stage as a limiter stage, thereby to maintain said signal weight relation substantially constant.

5. A signal shaping amplifier system for telegraph signals, comprising first and second resistance-capacity coupled push-pull stages each having a pair of vacuum tubes, said tubes each comprising a grid, a cathode and an anode, means for supplying telegraph signals of varying amplitude in push-pull relation to the grids of said first stage, circuit elements for biasing said first stage to act as an amplifier for accepting said signals of varying amplitude, circuit elements for biasing said second stage to the anode current cut-off condition in the absence of signals applied to said first stage, a single amplifier tube having a grid and a cathode, a connection from the grid of said last amplifier tube to the anode of one of said tubes in said first push-pull stage for receiving excitation therefrom, a rectifier coupled to the cathode of said single amplifier tube, a long time constant circuit of resistance and capacitance coupled to the output of said rectifier, a direct current amplifier stage coupled to and controlled by the output of said rectifier and normally biased to cut-off in the absence of signals, connections coupling said direct current amplifier to the circuit elements biasing said second stage, whereby the bias on said second stage is the sum of the cut-off voltage and a fixed percentage of the applied signal, and means for limiting the output of said second stage.

6. A signal shaping amplifier system for telegraph signals, comprising first and second resistance-capacity coupled push-pull stages each having a pair of vacuum tubes, said tubes each comprising a grid, a cathode and an anode, means for supplying telegraph signals of varying amplitude in push-pull relation to the grids of said first stage, circuit elements for biasing said first stage to act as an amplifier for accepting said signals of varying amplitude, circuit elements for biasing said second stage to the anode current cut-off condition in the absence of signals applied to said first stage, an amplifier device having a grid and a cathode, a connection from the grid of said device to the anode of one of said tubes in said first push-pull stage, a half-wave rectifier coupled to the cathode of said amplifier device and having a time constant circuit of resistance and capacitance in its output, a direct current amplifier stage coupled to and controlled by the output of said rectifier, connections coupling said direct current amplifier to the biasing circuit elements for said second push-pull stage, whereby the bias on said second stage is varied as a function of the amplitude of the signals, and means for limiting the output from said second stage.

7. A signal shaping amplifier system for telegraph signals, comprising first and second resistance-capacity coupled push-pull stages each having a pair of vacuum tubes, said tubes each comprising a grid, a cathode and an anode, means for supplying telegraph signals of varying amplitude in push-pull relation to the grids of said first stage, circuit elements for biasing said first stage to act as an amplifier for accepting said signals of varying amplitude, a bleeder resistance network connected from a point intermediate its end to the grids of the tubes of said second stage for biasing said second stage to cut-off in the absence of signals applied to said first stage, an amplifier device having a grid and a cathode and providing an output which is less than its input, a connection between said last grid and a tube in said first stage for supplying excitation potentials to said device, a resistor network in the cathode circuit of said amplifier device, a half-wave rectifier having an anode coupled to a point intermediate the ends of said last resistor network and having a cathode coupled to a time constant circuit, a D. C. amplifier having a grid coupled to the cathode of said rectifier and having cathode and anode electrodes coupled across a portion of said bleeder resistance network, said D. C. amplifier being biased to cut-off by the bleeder resistance network in the absence of signals, whereby the bias applied to the grids of said second stage in the presence of signals is the cut-off voltage plus a fixed percentage of the applied signal.

8. In a telegraph receiving system, a telegraph signal shaping circuit arrangement of the type which substantially restores the original rectangular pattern of on-off keyed tone signals, and maintains constant the weight of the marking elements thereof, said arrangement comprising a plurality of at least three cascaded push-pull amplifier stages, means for supplying the input of said first stage with telegraph signals which may be distorted by the medium over which they pass after being transmitted from a remote point, means for variably controlling the value of the direct current bias potential applied to the input electrodes of the second said amplifier stage as a function of the output potentials derived from the first stage, said last means including a grid biasing circuit, the impedance of which is varied by inclusion therein of an electron discharge device through the space path of which at least a portion of the current for said bias potential is fed, and means for producing a limiting action in the third stage.

WARREN A. ANDERSON.

REFERENCES CITED

The following references are of record in the file of this patent:

UNITED STATES PATENTS

| Number | Name | Date |
|---|---|---|
| 1,876,163 | Priechenfried | Sept. 6, 1932 |
| 2,007,416 | Affel | July 9, 1935 |
| 2,018,489 | Doba | Oct. 22, 1935 |
| 2,248,857 | Erickson | July 8, 1941 |
| 2,294,200 | Norman | Aug. 25, 1942 |
| 2,314,707 | Katzin | Mar. 23, 1943 |
| 2,370,685 | Rea | Mar. 6, 1945 |
| 2,392,672 | Koch | Jan. 8, 1946 |